INVENTOR
GUNNAR GIDEON EMANUELSSON
BY Leech & Radue
ATTORNEYS

INVENTOR
GUNNAR GIDEON EMANUELSSON
BY Leech & Radue
ATTORNEYS

INVENTOR
GUNNAR GIDEON EMANUELSSON
BY Leech & Radue
ATTORNEYS

United States Patent Office
2,851,614
Patented Sept. 9, 1958

2,851,614

DEVICE INTENDED TO CONVERT A PULSE INTO A NEW PULSE HAVING A STEEP LEADING EDGE

Gunnar Gideon Emanuelsson, Hagersten, Sweden, assignor to Telefonaktiebolaget L M Ericsson, Stockholm, Sweden, a company of Sweden Application November 7, 1952, Serial No. 319,404

Claims priority, application Sweden November 7, 1951

6 Claims. (Cl. 307—88.5)

This invention relates to a device intended to convert an applied pulse into a new pulse the leading edge of which occurs later than the leading edge of the applied pulse, and the trailing edge of which occurs at the same time as the trailing edge of the applied pulse.

One purpose of the invention is to obtain a simple device for selecting only those pulses, the duration of which exceeds a certain value, from a pulse train comprising pulses having equal amplitudes but different durations.

Another purpose of the invention is to select only those pulses, the amplitudes of which exceed a certain value, from a pulse train comprising pulses having equal durations but different amplitudes.

A further purpose of the invention is to obtain a new pulse having steep leading and trailing edges from a pulse, which has sloping leading and trailing edges.

Another purpose of the invention is to obtain an extraordinarily simple modulator without valves in order to generate pulses, the durations or time positions of which shall vary according to an applied modulation.

Still another purpose of the invention is to convert amplitude modulated pulses in a simple manner into duration or time position modulated pulses.

Previously known devices for these purposes usually comprise one or more electron valves and are generally more complicated than the devices according to the invention.

A device according to the invention is characterized by its comprising an L-section, the series impedance being an inductance and the shunt impedance being a diode, which normally is conducting, because it is passed by a steady state current; a pulse applied to the input terminals of said L-section causing an increasing current through said inductance and diode, which current has the opposite direction through the diode in relation to said steady current, so that when these currents are equally large, the diode is brought to a high impedance causing the potential of the output terminals of the device rapidly to be given the same value as the potential of the input terminals of the device.

Figure 1:
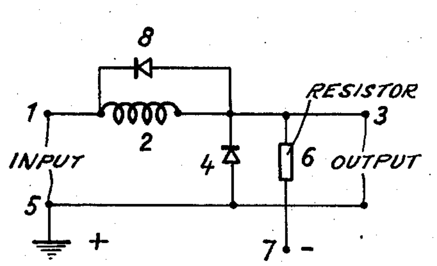
Figure 2:
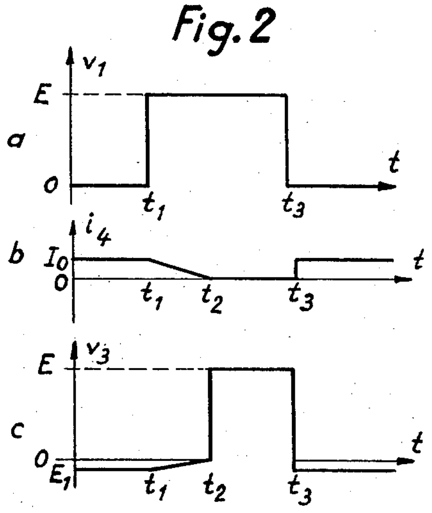
Figure 3:
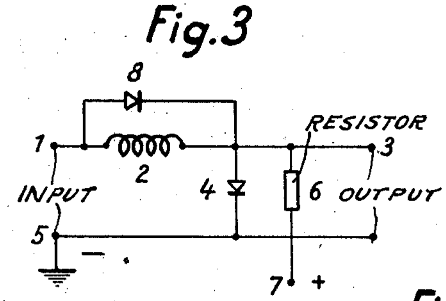
Figure 4:
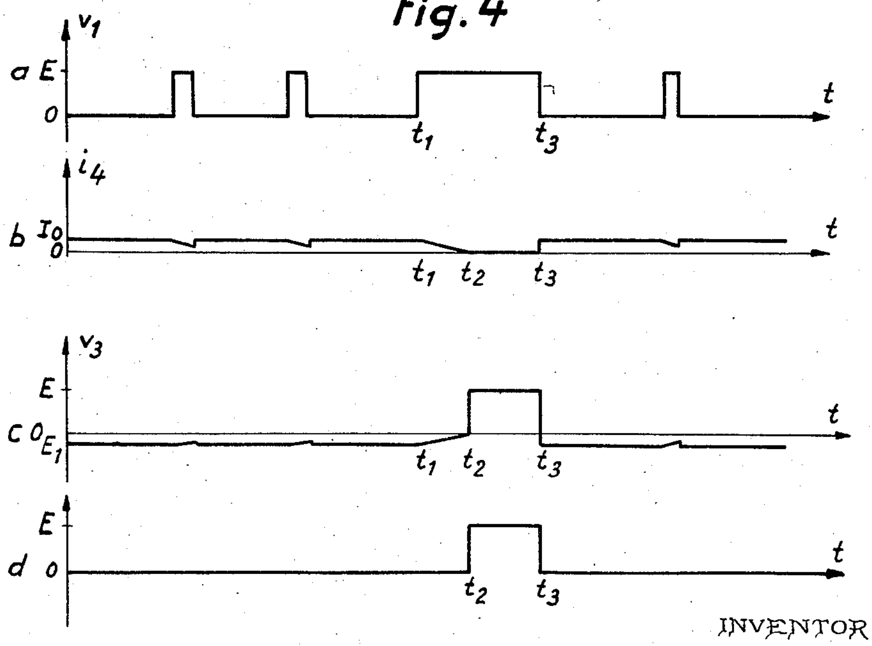
Figure 5:
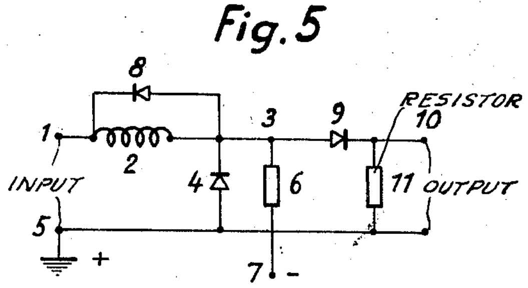
Figure 6:
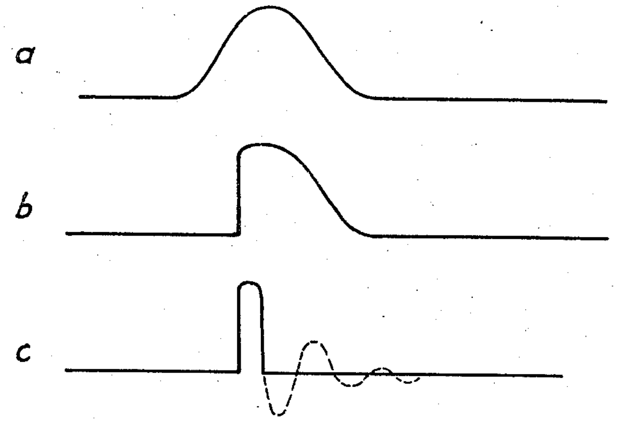
Figure 7:
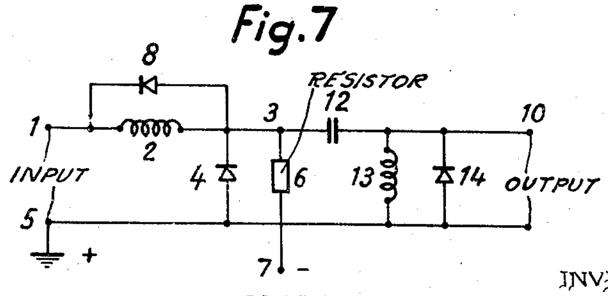
Figure 8:
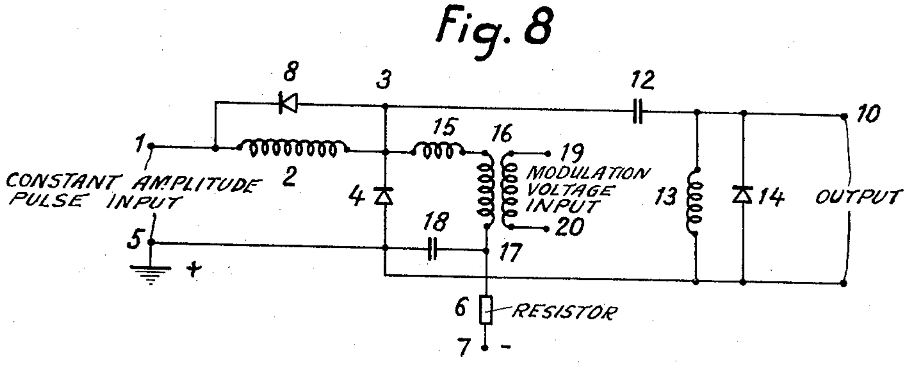
Figure 9:
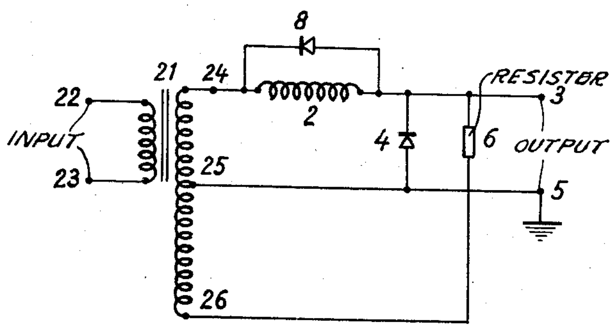

The invention will be closer described in connection with the accompanying drawing, wherein Fig. 1 shows a simple device according to the invention, Fig. 2 shows current and voltage wave forms as a function of time at said device and Fig. 3 shows another embodiment of the invention. Fig. 4 shows voltage and current wave forms in a device intended to select from a pulse train pulses, the duration of which exceed a certain determined value which device is shown in Fig. 5. Fig. 6 shows different voltage wave forms in a device intended to convert a pulse having sloping leading and trailing edges into a new pulse having steep leading and trailing edges, which device is shown in Fig. 7. Fig. 8 shows a device intended to give duration or time position modulated pulses. Fig. 9 finally shows an embodiment of the invention, where the applied pulse itself will give the necessary "steady state of current."

Fig. 1 shows a device according to the invention intended to convert an applied pulse into a new pulse, the leading edge of which occurs later than the leading edge of the applied pulse, and the trailing edge of which occurs at the same time as the trailing edge of the applied pulse.

One end of the coil 2 is connected to terminal 1, the other end of said coil being connected to a terminal 3. The anode of a diode 4 is connected to earth 5 and the cathode of said diode to terminal 3. A resistor 6 is connected between a voltage source 7, which has a negative potential, and terminal 3. The coil 2 is shunted by a diode 8, the cathode of which is connected to terminal 1 and the anode of said diode to terminal 3.

The device operates in the following manner. The diode 4 is normally conducting because a steady state current is flowing from earth 5 through the diode 4 and the resistor 6 to the negative voltage source 7. The magnitude of this current is mainly determined by the value of the resistor 6, the resistance of which is considerably greater than the resistance of the diode 4, when this is conducting. A positive pulse is applied between terminal 1 and earth. This pulse causes a current through the coil 2 and the diode 4, which current has a direction through the diode opposite to the direction of the steady state current through said diode. The current through the coil increases from zero and at least in the beginning quite linearly, and after a time, which is determined by the value of the inductance of the coil and the amplitude of the applied pulse, said current will reach the same value as the steady state current through the diode 4. This will then be non-conducting, and the potential of the terminal 3 will immediately increase up to the same value as that of the terminal 1 and remain at that value until the applied pulse ceases.

Fig. 2 shows voltage and current wave forms at some different points of the device according to Fig. 1. Fig. 2*a* shows the voltage $v$, at point 1 in Fig. 1, thus the applied pulse. The potential of point 1 is zero until the instant $t_1$, when it rapidly increases to the value E and remains at that value until the instant $t_3$, when the potential rapidly decreases to zero to remain at that value, until the next pulse is applied. Fig. 2*b* shows the current $i_4$ through the diode 4 as a function of time. This current has in the beginning a constant value $I_0$ equal to the steady state current through the diode 4 and the resistor 6. At the instant $t_1$ the applied positive pulse causes an increasing current counteracting the steady state current, so that the total current through the diode 4 decreases and reaches the value zero at the instant $t_2$. The diode will then be non-conducting and not until the instant $t_3$, when the applied pulse ceases, will the diode 4 be conducting again, and the current through it will then rapidly increase from zero to the value $I_0$ equal to the initial steady state current. Fig. 2*c* shows the voltage $v_3$ at point 3 as a function of time. The voltage $v_3$ has normally a value $E_1$ being the voltage drop across the diode caused by the steady state current and being some tenths of a volt negative. During the time $t_1$ to $t_2$ this voltage drop approaches zero, and at the instant $t_2$, when the diode 4 becomes non-conducting, it rapidly increases to the same value E as the amplitude of the applied pulse. When this ceases at the instant $t_3$ the voltage $v_3$ rapidly decreases to its initial value $E_1$.

Diode 8 shunting coil 2 is poled to be non-conducting until the applied pulse has ceased when it acts to rapidly dissipate the energy stored in the coil whereby the trailing edge of the pulse obtained across the output terminals has substantially the same shape as that of the pulse applied to the input terminals.

By changing the direction of the diodes 4 and 8 and connecting the resistor 6 to a positive bias source 7 according to Fig. 3 a device will be obtained, which converts a negative pulse applied to point 1 into a negative pulse obtained at point 3, the leading edge of said obtained pulse occurring at a later instant than the leading edge of the applied pulse and the trailing edge of said obtained pulse occurring at the same time as the trailing edge of the applied pulse.

The device according to the invention may to advantage be used for a great many purposes. In time division multiplex systems a number of channel pulses each belonging to a certain channel and a synchronizing pulse are transmitted. This is repeated at a frequency of usually 8000 cycles per second. At the receiver end the synchronizing pulse must be able to be selected. For this purpose the synchronizing pulse often consists of a pulse the duration of which is appreciably greater than the duration of each of the channel pulses. This invention makes possible inter alia a simple and excellent device for separating such a synchronizing pulse.

For this purpose the device according to Fig. 1 may be used, if the applied pulse train consists of positive pulses, and the device according to Fig. 3, if the applied pulse train consists of negative pulses. The method is described for a case, when the applied pulse train consists of positive pulses. The device is shown in Fig. 5 and is identical to the device according to Fig. 1, but for the anode of a diode 9 being connected to point 3, the cathode of said diode being connected to one of the output terminals 10. This terminal is connected to earth through a resistor 11. The diode 9 and the resistor 11 are not as a principle necessary, but they will give an improvement of the separation as will be shown later in connection with the current and voltage diagram in Fig. 4.

Through a suitable choice of the voltage of the negative voltage source 7 or of the resistance of the resistor 6 the steady state current through the diode 4 may be adjusted to a wanted value. At a given amplitude of the applied pulses one may through a suitable choice of the value of the inductance of the coil 2 choose the time, after which the current through the coil will be equal to the steady state current through the diode, so that this latter will be non-conduting, and a steep leading edge will be obtained at point 3. This time ought to be chosen so that it will exceed the duration of a channel pulse but be less than the duration of the synchronizing pulse. The resulting current $i_4$ through the diode 4 will then never decrease to zero during the duration of a channel pulse, see Fig. 4*b*. Fig. 4*a* shows the applied pulse train, where the pulses with short durations are channel pulses, and the pulse with a great duration is the synchronizing pulse. Fig. 4*c* shows the voltage $v_3$ of point 3. During the duration of a channel pulse, the voltage $v_3$ does not reach zero, because the current $i_4$ through the diode 4 does not reach zero either. When a pulse of a great duration, the synchronizing pulse, is applied, the current through the diode 4 does, however, reach the value zero during the duration of the pulse. At this instant $t_2$ the diode 4 will be non-conducting causing the potential of the point 3 rapidly to reach the same value as the amplitude of the applied pulse, Fig. 4*c*. The voltage $v_3$ will maintain that value during the remaining duration of the applied pulse and will then rapidly decrease to the value $E_1$ when the pulse disappears. The diode 9 will be conducting only during the time when point 3 has a potential equal to or exceeding zero. Between the output terminals 10 and 5 there will thus be obtained only one pulse derived from the synchronizing pulse but having a somewhat shorter duration than it. The channel pulses, however, will cause no detectable variation of the voltage between the output terminals 10 and 5. In spite of this the pulse obtained at the output terminals will get the same amplitude as that of the applied synchronizing pulse, which is not the case in previously known devices for selecting a pulse, the duration of which exceeds a certain value.

A device according to the invention, e. g. the device shown in Fig. 1, will also give the possibility of selecting only such pulses, the amplitudes of which exceed a certain given level, from a pulse train comprising pulses having equal durations but different amplitudes. The greater amplitude the pulse applied at the input terminals has, the more rapidly the current through the inductance will increase. The time, after which said current will reach the same value as the steady state current through the conducting diode 4 causing this rapidly to be non-conducting, so that the voltage across the diode will rapidly obtain the same value as the voltage across the input terminals, will thus be inversely proportional to the amplitude of the applied pulse. In order to make it possible to separate only such pulses, the amplitudes of which exceed a certain given level, the steady state current $I_0$ through said diode 4 shall be chosen so in relation to the value of said inductance 2 and the duration of the applied pulses, that the resulting current $i_4$ through said diode 4 will be zero at the instant of the trailing edge of an applied pulse, the amplitude of which reaches the given level previously mentioned.

The applied pulse has hitherto been supposed to have a rectangular shape and short leading and trailing edges. This need not necessarily be the case. The device according to Fig. 1 may also be used to convert a pulse having very sloping leading and trailing edges as in Fig. 6*a* into a pulse, which has a short leading edge as in Fig. 6*b*. As in the previous case the pulse applied to the terminals 1 and 5 will according to Fig. 6*a* cause an increasing current through the coil 2. When this current is equal to the steady state current through the diode 4, this will be non-conducting and point 3 will rapidly obtain and remain at the same potential as point 1.

In order to convert a pulse according to Fig. 6*a* into a pulse which has a shorter duration and a steep leading as well as trailing edge a differentiating circuit may be connected to point 3 in Fig. 1. In this case the embodiment of the device will be e. g. according to Fig. 7. Between point 3 and one of the output terminals, 10, a condenser 12 is connected, which condenser has a relatively low capacitance. Between the output terminal, 10 and earth 5, a coil 13, which has a relatively low inductance, is connected. Said coil is shunted by a diode 14, the anode of which is connected to earth and the cathode of which is connected to the terminal 10. The sudden jump of the voltage of point 3 causes a damped oscillation in the parallel circuit, which consists of the coil 13 and its winding capacitance and the stray capacitance between point 10 and earth. A pulse is thereby obtained at point 10, which pulse has steep leading and trailing edges according to the solid curve in Fig. 6*c*. The diode 14 will damp the later oscillations, which would have been obtained without any diode, and which are shown by the dotted curve in Fig. 6*c*. Of course the coil 13 may be substituted by a resistor, in which case the diode 14 would not be necessary. But a differentiating device according to that one shown in Fig. 7 would give a better shape to the pulse at the output terminals.

A device according to the invention may be obtained, which constitutes a very simple modulator for obtaining time modulated pulses, i. e. pulses, the durations or time positions of which vary in synchronism with an applied modulation voltage. Fig. 8 shows an embodiment of such a modulator. Normally a steady state current passes the diode 4, the coil 15, the secondary winding of a transformer 16 and the resistor 6 to a negative bias 7. The connection point 17 between the secondary winding of the transformer 16 and the resistor 6 is suitably shunted by a by-pass condenser 18. The coil 15, for which a resistor may be substituted, shall prevent point 3 from being short-circuited to earth for the high frequencies through the winding and stray capacitances of the transformer 16. To the input terminals 19 and 20 of the transformer 16 a modulation voltage is applied. This causes the steady state current through the diode 4 to increase or decrease. Pulses having a constant amplitude are applied to the input terminals 1 and 5, the duration of said pulses being greater than the wanted maximum time modulation. The time needed for such a pulse to build up a current of such a value through the coil 2, that this current will be equal to the instantaneous steady state current through the diode 4, will be directly proportional to the value of the instantaneous steady state current and thus depending upon the modulation voltage applied to the terminals 19 and 20. At the very moment the current through the diode 4 is zero, the diode will be non-conducting and the potential of point 3 will rapidly increase to the same value as the amplitude of the applied pulse and remain at that value as long as the pulse applied to point 1 exists. When this pulse ceases the potential of point 3 will also rapidly decrease. In point 3 pulses with constant amplitudes are thus obtained, the duration of said pulses varying in synchronism with the instantaneous steady state current through the diode 4 and thereby in synchronism with the applied modulation voltage. These pulses may afterwards be converted into time position modulated pulses by adding a differentiating circuit to point 3, e. g. the previously described circuit consisting of the condenser 12, the coil 13 and the diode 14. Time position modulated pulses will thus be obtained in point 10 in Fig. 8. The amplitudes of these pulses will be almost equal to the amplitudes of the pulse applied to point 1. These pulses may easily obtain a duration of about 0.5 microseconds, i. e. the duration which in practice is wanted for time position modulated pulses. In a multichannel pulse system the points 10 of the different channel modulators may be connected together directly or through passive parts. The following necessary common amplification and pulse shapening of the channel pulse train will thus be quite small.

It has been mentioned above that the instant, at which the current through the coil 2 reaches the same value as the steady state current through the diode 4, will be dependent upon the ampltiude of the pulse applied to point 1. The invention will thus make possible a simple device for converting amplitude modulated pulses into duration or time position modulated pulses. For this purpose a device e. g. according to Fig. 7 may be used. The steady state current through the diode 4 is determined by the negative bias 7 and the resistor 6. Amplitude modulated pulses are applied to point 1. The necessary time for such a pulse to build up through the coil 2 a current of the same magnitude as the steady state current through the diode 4 will be reciprocally proportional to the amplitude of the applied pulse. In point 3 pulses will thus be obtained, the duration of which will be reciprocally proportional to the amplitudes of the pulses applied to point 1. After a differentiating circuit, e. g. the one shown in Fig. 7, time position modulated pulses will be obtained in point 10. The amplitudes of the pulses applied to point 1 shall vary between a certain maximum value and a certain minimum value, the latter being greater than zero. This minimum value must not be so small, that the current through the coil 2 cannot exceed the value of the steady state current through the diode 4. Otherwise no pulse would be obtained in point 3 or 10. The duration or time position modulated pulses obtained in point 3 or 10 will, however, also be amplitude modulated. But the amplitude will not be less than the previously mentioned minimum value of the amplitude of the amplitude modulated pulses applied to point 1. They may therefore be amplitude limited by some known device, causing the amplitude modulation to be removed from the duration or time position modulated pulses. The limiter may be connected before or after the differentiating circuit.

In all above mentioned cases it has been supposed that the diode 4 in the shunt branch of the L-section shall get its steady state current from a fixed bias 7 through a high series resistance 6. Said bias may, however, also be the applied pulse itself, but may also be applied in an obvious manner to the embodiments of Figs. 1, 3, 5, 7 and 8. How this may be done will be clear from the following. An example of this is shown in Fig. 9. A pulse is applied to the input terminals 22 and 23 of the primary winding of a pulse transformer 21. The above mentioned coil 2 is connected between one end 24 of the secondary winding of the pulse transformer and one of the output terminals 3 of the device, which terminal is connected to the other output terminal 5 of the device through said diode 4. The output terminal 5 is further connected to a tap 25 somewhere between the end terminals 24 and 26 of the secondary winding of the transformer 21. The terminal 26 is connected through a resistor 6 having a high resistance to the connection point 3 between said coil 2 and diode 4. The device operates in the following manner: Suppose a positive pulse to be applied to the input terminals 22 and 23 of the transformer 21. The terminal 26 of the secondary winding will then be negative in relation to earth causing a current corresponding to the steady state current previously mentioned to flow through the diode 4 and the resistor 6. The other end terminal 24 of the secondary winding will be positive in relation to earth 5 when the pulse is applied. This causes an increasing current through the coil 2, which current after a certain time will be equal to the "steady state current" through the diode 4, causing this to be non-conducting so that the output terminal 3 will rapidly obtain the same potential in relation to earth 5 as the first mentioned end terminal 24 of the secondary winding. Such a device will be insensitive to amplitude variations of the applied pulse. The time, after which the diode 4 will be non-conducting, is determined by the inductance of the coil 2, the location of the tap 25 between the end terminals of the secondary winding and the resistance of the resistor 6, which is connected between the end terminal 26 of the secondary winding and the connection point between said coil 2 and diode 4.

The device shown in Fig. 1, to the input terminals of which positive pulses are applied, may, as has previously been mentioned above, be used for applied negative pulses, if the diodes of the device are connected in the opposite directions, and the bias 7 is given the opposite polarity as in Fig. 2. It is evident that the devices later described also may be used for applied negative pulses so that negative pulses will be obtained at the output terminals. In these devices the direction of all diodes shall then be reversed and the bias 7 be given the opposite polarity to that shown in the figures. In the device shown in Fig. 9 only the directions of the diodes shall be reversed, if negative pulses instead of positive are to be applied, because the "steady state current" will automatically change its direction.

I claim:

1. An electric circuit for converting a pulse into one having a steep leading edge occurring later than that of the initial pulse comprising in combination, an L-section having input and output terminals, the series impedance of said section being a simple inductance and the shunt impedance being a diode, means to supply a steady state potential to said diode to render the same conducting, means to apply each initial impulse to the input terminals to cause an increasing current through the inductance and through the diode in a direction opposite to the steady state current so that when these currents are equal the output terminals achieve a potential substantially the same as those of the input terminals and a second diode shunting said inductance and poled to be non-conducting for the pulses but serving to discharge the inductance as each pulse ceases, to cause substantial similarity of shape of the trailing edges of applied and output pulses.

2. An electric circuit for converting a pulse into one having a steep leading edge occurring later than that of the initial pulse comprising in combination, an L-section having input and output terminals, the series impedance of said section being a simple inductance and the shunt impedance being a diode, means to supply a steady state potential to said diode to render the same conducting, comprising a source poled for forward flow through the diode and a series impedance of such high resistance that the steady state current flow is substantially independent of variations in the forward resistance of the diode, means to apply each initial impulse to the input terminals to cause an increasing current through the inductance and through the diode in a direction opposite to the steady state current so that when these currents are equal the output terminals achieve a potential substantially the same as those of the input terminals.

3. An electric circuit for converting a pulse into one having a steep leading edge occurring later than that of the initial pulse comprising in combination, an L-section having input and output terminals, the series impedance of said section being a simple inductance and the shunt impedance being a diode, means to supply a steady state potential to said diode to render the same conducting, means to apply each initial impulse to the input terminals to cause an increasing current through the inductance and through the diode in a direction opposite to the steady state current so that when these currents are equal the output terminals achieve a potential substantially the same as those of the input terminals, a differentiating circuit connected to said output terminals comprising a series connected condenser and a shunt connected inductance whereby to convert a pulse with sloping leading and trailing edges into one with steep leading and trailing edges.

4. The electric circuit of claim 3 having means to eliminate from the pulse the oscillations obtained by differentiating the trailing edge thereof comprising a diode shunting said last mentioned inductance and poled such that a pulse obtains across the output of the differentiating circuit only at the instant corresponding to the leading edge of the pulse delivered to the differentiating circuit.

5. The circuit of claim 4 in which said differentiating condenser has a small capacity and the differentiating inductance has a small value.

6. An electric circuit for converting initial electrical pulses into time position modulated pulses having steep leading edges which edges appear later than those of the initial pulses comprising an L-section having input and output terminals, the series impedance of said section being an inductance and the shunt impedance being a diode, means to supply a steady state current to said diode to render the same conducting, means to apply each initial pulse to the input terminals to cause an increasing current through the inductance and a component thereof through the diode in a direction opposite to the steady state current whereby at the moment when the increasing current component is equal to the steady state current the diode becomes non-conducting and offers a high impedance so that the output terminals then rapidly and substantially reach a potential equal to that of the pulse at the input terminals, means to superimpose a modulating current on the steady state current through the diode in such a manner that the moment when the diode is non-conducting is caused to vary in synchronism with the applied modulating current whereby duration modulated pulses will be obtained at the output terminals, and differentiating means connected to said output terminals for converting said duration modulated pulses to time position modulated pulses.

References Cited in the file of this patent

UNITED STATES PATENTS

| | | |
|---|---|---|
| 1,312,433 | Carson | Aug. 3, 1919 |
| 1,416,077 | Tanner | May 16, 1922 |
| 2,128,643 | George | Aug. 30, 1938 |
| 2,181,568 | Kotowski | Nov. 28, 1939 |
| 2,432,204 | Miller | Dec. 9, 1947 |
| 2,441,963 | Gray | May 25, 1948 |
| 2,452,547 | Chatterjea | Nov. 2, 1948 |
| 2,565,497 | Harling | Aug. 28, 1951 |
| 2,657,318 | Rack | Oct. 27, 1953 |
| 2,676,250 | Trousdale | Apr. 20, 1954 |
| 2,685,039 | Scarbrough et al. | July 27, 1954 |